Feb. 6, 1951            C. S. ASH            2,540,316
VEHICLE WHEEL
Filed Jan. 25, 1947
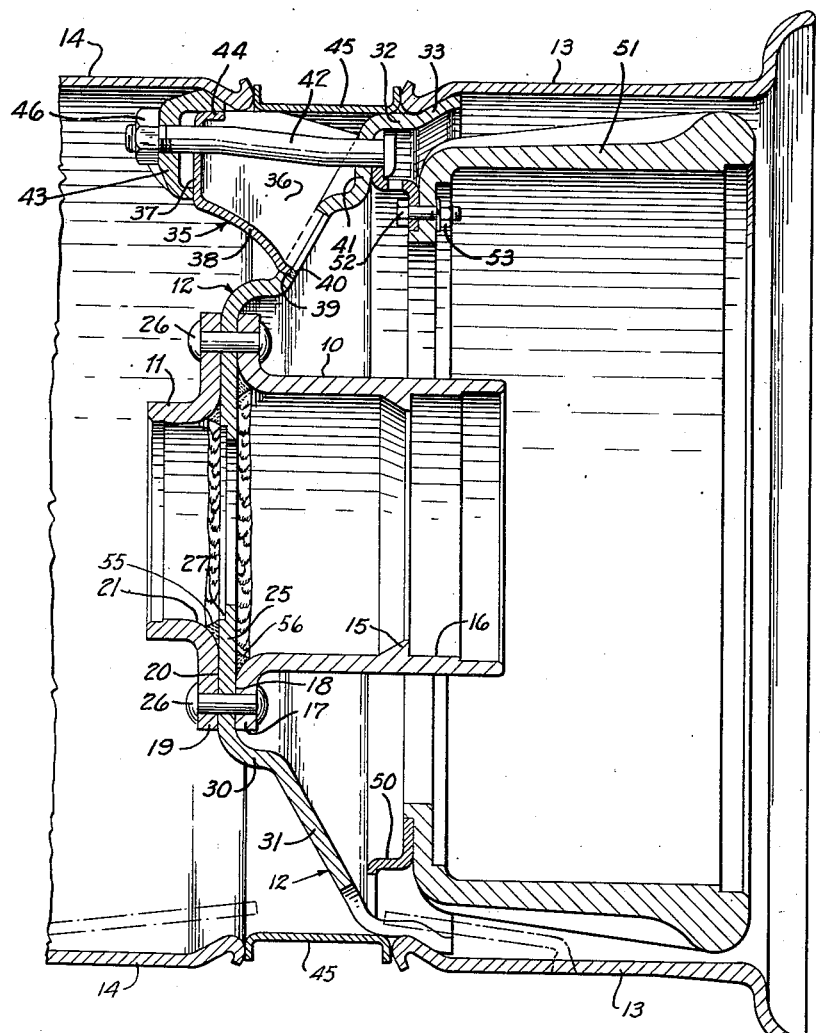
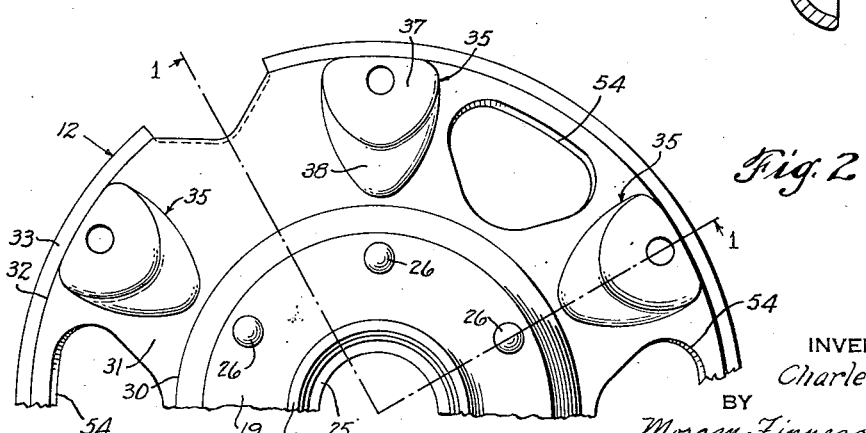
INVENTOR
Charles S. Ash
BY
Morgan, Finnegan & Durham
ATTORNEYS Patented Feb. 6, 1951

2,540,316

UNITED STATES PATENT OFFICE 2,540,316

VEHICLE WHEEL

Charles S. Ash, Milford, Mich.

Application January 25, 1947, Serial No. 724,391

4 Claims. (Cl. 301—105)

The present invention relates to vehicle wheels.

This application is a continuation-in-part of my copending application Serial Number 607,597, filed July 28, 1945, now Patent No. 2,507,876, issued May 16, 1950.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Fig. 1 is a cross-sectional view of a vehicle wheel embodying the present invention; and Fig. 2 is a fragmentary end elevation of the wheel shown in Fig. 1 as seen from the outboard side of the wheel, the rims shown mounted on the wheel in Fig. 1 being omitted in Fig. 2.

It is an object of the present invention to provide an improved vehicle wheel which is particularly adapted for heavy duty uses such as, for instance, on trucks, trailers and similar vehicles. Another object of the invention is the provision of a safe and sturdy vehicle wheel adapted to demountably mount a pair of pneumatic tire rims. The invention further provides a wheel which is more economical to make than known wheels, and in which a simplified and improved hub structure is included.

Referring now in detail to the illustrative embodiment of the invention shown by way of example in the accompanying drawings, the wheel of the invention comprises generally a two piece hub construction comprising an inner hub element 10 and an outer hub element 11, and a web member 12 adapted to removably mount a pair of conventional tire rims 13 and 14.

As shown, the inner hub element 10 is formed with an internal shoulder 15 and seat 16 to receive an axially inner anti-thrust bearing whereby the wheel is mounted for rotation on an axle, and at its outer end is formed in an integral outwardly radially extending flange portion 17 which provides a surface 18 lying preferably in a plane normal to the axis of the wheel. The hub element 10 may be conveniently and economically formed from a piece of tubing forged into the form shown.

The outer hub element 11 is of relatively short cylindrical extent and of somewhat smaller diameter than the element 10. It is formed with an integral outwardly radially extending flange portion 19 having an axially inner radial surface 20 lying preferably in a plane normal to the axis of the wheel. A cylindrical seat 21 is provided to receive the outer anti-friction bearing by which the wheel is mounted on an axle, and a shoulder for said bearing is provided by a portion of the wheel web 12, as will presently be explained. The hub element 11 may be made out of a flat blank if desired and formed as shown.

At its inner periphery the web member 12 is formed in a plane annular portion 25 the opposed radial faces of which lie in planes normal to the axis of the wheel and are adapted to abut respective ones of the surfaces 18 and 20 of the hub elements when the separately formed wheel parts are brought into assembled relationship as shown. The parts may be securely fixed together by circular welds 55 and 56 and, if desired, by a plurality of rivets 26 extending through the flange portions 17 and 19 and the plane annular web portion 25. It will be understood that other convenient means as, for instance welding, could be utilized to secure the wheel parts together.

The plane portion 25 of the web extends radially inwardly slightly over the inner end of the hub element 11 and thus provides a shoulder for the bearing seated in seat 21, and may if desired be stepped as shown at 27 to receive and hold the bearing end in a secure position in the hub.

Radially outwardly of plane portion 25 the web member 12 is formed in an abruptly axially inwardly turned portion 30 which then merges into a frusto-conical portion 31 extending to the outer periphery of the wheel. The web member is thus strongly formed for heavy duty uses, and is preferably fabricated from a flat blank of material pressed or stamped and punched into the form shown in the drawings.

At its outer periphery the web 12 is formed with an integral cylindrical portion 32 which is flared at its axially inner end in a frusto-conical portion 33 providing an inclined circumferential surface for the wheel upon which the inner rim 13 may be seated.

The means for assembling the outer rim 14 on the wheel include a plurality of hollow spoke-like members 35 secured to web 12 and extending axially outwardly therefrom. The members 35 are preferably fabricated by stamping or pressing, and are formed as shown with side walls 36, straight upper front walls 37 and curved lower front walls 38. The curved margins of walls 38 are received within apertures 39 provided in web 12, and the wheel elements may be conveniently joined by welding as indicated at 40.

The web 12 is flattened at positions 41 behind the spoke-like members 35 and apertured to receive wheel mounting bolts 42 which extend axially outwardly through suitable apertures in the walls 37 of members 35. Lugs 43 to be positioned on the mounting bolts are adapted to be seated on walls 37 and turned portions 44 at the top thereof, and the lugs provide seats for the outer tire rim 14. Any suitable spacing ring 45 and mounting nuts 46 complete the demountable dual rim assembly on the wheel.

Braking means for the wheel include an S-shaped ring 50 adapted to be held to the flattened places 41 of the web by suitable welding or other means. The ring removably carries a brake drum 51 being secured thereto by a plurality of bolts 52 and nuts 53.

The web 12 may, if desired, be lightened without material loss of strength by providing a plurality of apertures designated 54 in the frusto-conical extent between the spoke-like members 35.

In the dual rim wheel structure shown and described it will be apparent that there is provided an economically fabricated, strong and well-balanced wheel unit. The hub and web elements are formed of relatively small and easily made parts strongly assembled in the finished wheel. Complicated and expensive castings are not required in the formation of the wheel.

The invention in its broader aspects is not limited to the specific mechanisms shown and described but departures may be made therefrom, within the scope of the accompanying claims, without departing from the principles of the invention and without sacrificing its chief advantages.

What I claim is:

1. A vehicle wheel comprising, in combination, a radially extending web member and a pair of cylindrical hub elements one secured to either side of said member, said member extending radially inwardly between said elements and at least partially covering the bore of one of said elements, said one element being formed with an internal bearing seat and said member being formed with a cooperating seat and a shoulder whereby a bearing may be seated in said one element and said member and said member serves as a shoulder for the bearing.

2. In a vehicle wheel having a radially extending tire supporting structure, the combination with said structure of a radially inner annular member secured thereto and a pair of cylindrical hub elements positioned to either side of said member, said member extending radially inwardly between said elements and at least partially covering the bore of one of said elements, said one element being formed with an internal bearing seat and said member being formed with a cooperating seat and a shoulder whereby a bearing may be seated in said one element and said member, and said member serves as a shoulder for the bearing.

3. A vehicle wheel comprising, in combination, a radially extending tire supporting structure, a radially inner, plane annular member secured thereto, and a pair of cylindrical hub elements having flanged end portions secured to respective sides of said member, said member extending radially inwardly between said elements and at least partially covering the bore of one of said elements, said one element being formed with an internal bearing seat and said member being formed with a cooperating seat and a shoulder whereby a bearing may be seated in said one element and said member, and said member serves as a shoulder for the bearing.

4. A vehicle wheel hub including, in combination, an annular member and a pair of separately formed cylindrical hub elements secured one at either side of said member, said member extending radially inwardly to at least partially cover the bore of one of said elements, said one element being formed with an internal bearing seat and said member being formed adjacent its inner periphery with a cooperating seat and shoulder to provide bearing seats for radial and axial thrusts.

CHARLES S. ASH.

REFERENCES CITED

The following references are of record in the file of this patent:

UNITED STATES PATENTS

| Number | Name | Date |
| --- | --- | --- |
| 1,398,738 | Putnam | Nov. 29, 1921 |
| 1,660,660 | White | Feb. 28, 1928 |
| 1,703,714 | Booth | Feb. 26, 1929 |
| 1,751,291 | Robbins | Mar. 18, 1930 |
| 1,895,499 | Stough | Jan. 31, 1933 |
| 2,231,207 | Baker | Feb. 11, 1941 |